Patented Oct. 7, 1947

2,428,535

UNITED STATES PATENT OFFICE 2,428,535

ETHYL ESTER OF ACETYL MANDELYL-BETA-ALANIDE AND THE PROCESS FOR PREPARING SAME

Harold Urist and Gustav J. Martin, Philadelphia, Pa., assignors to The National Drug Company, Philadelphia, Pa., a corporation of Pennsylvania No Drawing. Application January 14, 1947, Serial No. 722,078

2 Claims. (Cl. 260—471)

This invention relates to a derivative of mandelic acid and more particularly, refers to a new compound having excellent chemotherapeutic properties, particularly as a urinary antiseptic.

It is an object of this invention to produce a new chemotherapeutic agent which is effective against streptococcus, staphylococcus, pneumococcus, and other harmful microorganisms. A further object is to produce a compound which is particularly adapted for use as a urinary antiseptic. Additional objects will become apparent from a consideration of the following description and claims.

These and other objects are obtained by the present invention, which is concerned with certain mandelic acid derivatives, particularly ethyl ester acetyl mandelyl-beta-alanide. In accordance with our invention this compound is prepared by the condensation of acetyl mandelyl chloride with the ethyl ester of beta-alanide hydrochloride in pyridine solution. This may be accomplished by adding to a solution of the ethyl ester of beta-alanine hydrochloride (14.5 grams) in anhydrous pyridine (75 ccs.) 20.4 grams of acetyl mandelyl chloride. The mixture is cooled and stirred for a period of 15 minutes, after which it is allowed to stand overnight. It is then concentrated in vacuo and the residue dissolved in ethyl acetate, followed by washing with dilute hydrochloric acid, water, dilute sodium bicarbonate, and water. It is then concentrated in vacuo, advisably using an oil pump in the final step.

From the foregoing reaction there is obtained 15.4 grams of a viscous brown oil corresponding to a yield of 55%. This product is the ethyl ester of acetyl mandelyl-beta-alanide.

Calculated for N, 4.78%; found, 4.79%; 4.79%.

The acetyl mandelyl chloride employed in the above example may be prepared by refluxing 100 grams of mandelic acid for one-half hour with 200 cc. of acetic anhydride. The reaction mixture is then concentrated in vacuo and refluxed for 4 hours with 200 cc. of thinoyl chloride. The excess thionyl chloride is distilled in vacuo and the residue fractionated. There is obtained 78.7 grams of acetyl mandelyl chloride having a boiling point of 134–136° C./15 mm. This corresponds to a yield of 56.5%.

The ethyl ester of beta-alanine hydrochloride employed in the above example may be produced by suspending 10 grams of beta-alanine in 200 cc. of absolute ethanol. The suspension is saturated with dry hydrochloric acid and refluxed for 1 hour, after which it is concentrated in vacuo to a viscous oil. The oil is dissolved in chloroform and absolute ether is added to the solution. A precipitate occurs which is collected and dried, yielding 14 grams of the ethyl ester of beta-alanine hydrochloride, having a melting point of 145–168° C. and corresponding to a yield of 81%.

It is to be understood that the conditions of reaction and certain of the reactants referred to in the above examples may be varied without departing from the scope of this invention. Such variations will be obvious to those familiar with this art, in the light of the foregoing instructions.

The ethyl ester of acetyl mandelic-beta-alanide is a surprisingly effective chemotherapeutic agent. It is an effective antibacterial since it destroys streptococcus, staphylococcus, pneumococcus and other microorganisms. It has been found to be particularly useful as a urinary antiseptic.

This compound and its closely related homologs may be administered either orally or by injection. For this purpose from 100 milligrams to 1 gram daily, divided into two or three doses, is generally ample to obtain the desired result. The dosage will, of course, depend upon the age and condition of the patient.

This material may be used as a substitute for the various sulfa drugs and related chemotherapeutic agents, since its antibacterial properties are even more pronounced than those of many known agents of this general type. In addition, it may, if desired, be used in admixture with other chemotherapeutic agents.

As many apparently widely different embodiments of this invention may be made without departing from the spirit and scope hereof, it is to be understood that the invention is not limited to the specific embodiments hereof, except as defined in the appended claims.

We claim:
1. Ethyl ester of acetyl mandelyl-beta-alanide.
2. A process which comprises reacting the ethyl ester of beta-alanine hydrochloride with acetyl mandelyl chloride in the presence of pyridine, and removing the resulting reaction product.

HAROLD URIST.
GUSTAV J. MARTIN.